US012807119B2

(12) United States Patent
Kim

(10) Patent No.: US 12,807,119 B2
(45) Date of Patent: Nov. 24, 2026

(54) METHOD FOR CONTROLLING FAIL-SAFE OF ELECTRONIC MECHANICAL BRAKE APPARATUS

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/047,702

(22) Filed: Feb. 7, 2025

(65) Prior Publication Data

US 2025/0388202 A1 Dec. 25, 2025

(30) Foreign Application Priority Data

Jun. 21, 2024 (KR) ........................ 10-2024-0080963

(51) Int. Cl.
*B60T 17/00* (2006.01)
*B60T 8/171* (2006.01)
*B60T 8/172* (2006.01)
*B60T 8/26* (2006.01)
*B60T 17/18* (2006.01)

(52) U.S. Cl.
CPC .............. *B60T 17/18* (2013.01); *B60T 8/171* (2013.01); *B60T 8/172* (2013.01); *B60T 8/26* (2013.01); *B60T 2270/402* (2013.01)

(58) Field of Classification Search
CPC .......... B60T 17/18; B60T 8/171; B60T 8/172; B60T 8/26; B60T 2270/402; B60T 8/885; B60T 13/741; B60T 13/74; B60T 17/221; B60Y 2306/13; B60Y 2400/81
See application file for complete search history.

(56) References Cited

U.S. PATENT DOCUMENTS 10,501,063 B2 * 12/2019 Krueger ................ B60T 8/3255
11,884,253 B2 * 1/2024 Hwang ................... B60T 8/171
12,090,973 B2 * 9/2024 Witte .................... B60T 17/221
12,097,838 B2 * 9/2024 Brok ..................... B60T 13/588
12,109,991 B2 * 10/2024 Feigel .................. B60T 13/662
12,195,017 B2 * 1/2025 Chen ...................... B60T 17/22

(Continued)

*Primary Examiner* — Logan M Kraft
*Assistant Examiner* — Sherman D Manley
(74) *Attorney, Agent, or Firm* — NovoTechIP International PLLC

(57) ABSTRACT

A fail-safe control method of an electromechanical brake apparatus comprising a plurality of wheel controllers, a main controller, and an auxiliary controller that control electro-mechanical brakes disposed on each wheel of a vehicle, the method comprising: deciding a self-status of each of the plurality of wheel controllers, the main controller, and the auxiliary controller based on pre-classified status information; sharing self-status decided by each of the plurality of wheel controllers, the main controller, and the auxiliary controller; determining a status of one another based on the shared self-status among the plurality of wheel controllers, the main controller, and the auxiliary controller; activating a pre-designated fail-safe mode based on status information of each of the plurality of wheel controllers, the main controller, and the auxiliary controller; and performing emergency braking of the vehicle based on the pre-designated fail-safe mode or maintaining the vehicle in a drivable status.

10 Claims, 3 Drawing Sheets

(56) References Cited

U.S. PATENT DOCUMENTS

| | | | | |
|---|---|---|---|---|
| 2006/0212135 | A1* | 9/2006 | Degoul | B60T 8/3255 700/20 |
| 2010/0243388 | A1* | 9/2010 | Holzwarth | B60T 8/885 188/158 |
| 2018/0215368 | A1* | 8/2018 | Isono | B60T 13/748 |
| 2022/0024427 | A1* | 1/2022 | Kim | B60T 13/741 |
| 2022/0041058 | A1* | 2/2022 | Nemeth | B60W 10/20 |
| 2022/0169222 | A1* | 6/2022 | Ullrich | B60Q 9/00 |
| 2022/0306063 | A1* | 9/2022 | Choi | B60T 13/741 |
| 2022/0314953 | A1* | 10/2022 | Brok | B60T 13/662 |
| 2022/0324425 | A1* | 10/2022 | Kim | B60T 8/885 |
| 2022/0371561 | A1* | 11/2022 | Brenn | B60T 17/221 |
| 2023/0192048 | A1* | 6/2023 | Moon | B60T 1/10 701/22 |
| 2023/0278535 | A1* | 9/2023 | Marx | B60T 7/107 188/106 P |
| 2023/0331207 | A1* | 10/2023 | Wang | B60T 8/326 |
| 2024/0132034 | A1* | 4/2024 | Xie | B60T 13/741 |
| 2024/0132036 | A1* | 4/2024 | Xie | B60T 8/885 |
| 2024/0140385 | A1* | 5/2024 | Xie | B60T 8/88 |
| 2024/0166177 | A1* | 5/2024 | Saotome | B60T 8/171 |

* cited by examiner

| Case | MAIN CONTROLLER | AUXILIARY CONTROLLER | LEFT FRONT WHEEL CONTROLLER | RIGHT FRONT WHEEL CONTROLLER | LEFT REAR WHEEL CONTROLLER | RIGHT REAR WHEEL CONTROLLER | Safe Mode |
|---|---|---|---|---|---|---|---|
| 1 | Degraded | Normal | Normal | Normal | Normal | Normal | Safe Mode1 |
| 2 | Abnormal | Normal | Normal | Normal | Normal | Normal | Safe Mode2 |
| 3 | Normal | Degraded | Normal | Normal | Normal | Normal | Safe Mode3 |
| 4 | Normal | Abnormal | Normal | Normal | Normal | Normal | Safe Mode4 |
| 5 | Normal | Normal | Degraded | Normal | Normal | Normal | Safe Mode5 |
| 6 | Normal | Normal | Abnormal | Normal | Normal | Normal | Safe Mode6 |
| 7 | Normal | Normal | Normal | Degraded | Normal | Normal | Safe Mode7 |
| 8 | Normal | Normal | Normal | Abnormal | Normal | Normal | Safe Mode8 |
| 9 | Normal | Normal | Normal | Normal | Degraded | Normal | Safe Mode9 |
| 10 | Normal | Normal | Normal | Normal | Abnormal | Normal | Safe Mode10 |
| 11 | Normal | Normal | Normal | Normal | Normal | Degraded | Safe Mode11 |
| 12 | Normal | Normal | Normal | Normal | Normal | Abnormal | Safe Mode12 |

※Normal: NORMAL STATUS / Degraded: FUNCTION DEGRADED STATUS / Abnormal: UNFUNCTIONAL STATUS

*FIG. 2*

METHOD FOR CONTROLLING FAIL-SAFE OF ELECTRONIC MECHANICAL BRAKE APPARATUS

CROSS-REFERENCE TO RELATED APPLICATIONS

This application claims the benefit of priority to Korean Patent Application No. 10-2024-0080963 filed in the Korean Intellectual Property Office on Jun. 21, 2024, the entire contents of which are incorporated herein by reference.

TECHNICAL FIELD

The present disclosure relates to a method for controlling fail-safe of an electronic mechanical (or electromechanical) brake apparatus.

BACKGROUND

The description in this section merely provides background information related to the present disclosure and does not constitute the related art.

An electromechanical brake system uses a pedal simulator mounted on a pedal to sense the amount of pedaling by a driver and transmits the same to a central controller. The central controller calculates the braking force required for each wheel and transmits a braking command to the wheel controllers disposed on each wheel. The wheel controllers that receive the braking command generate a braking force using a motor-based electromechanical brake actuator mounted on each wheel. The electromechanical brake system may perform active braking and independent braking of each wheel, and thus may perform functions such as ABS (anti-lock braking system), VDC (vehicle dynamic control), TCS (traction control system), and EPB (electric parking brake).

The electromechanical brake system is generally configured of a single system composed of a plurality of central controllers and wheel controllers mounted on each wheel. Accordingly, the failure modes of the electromechanical brake system are diverse, and fail-safe strategies based on the failure modes may also be diversely configured. Accordingly, there is a need to efficiently configure a complex fail-safe strategy for the electromechanical brake system.

SUMMARY

A main purpose of the present disclosure is directed to addressing an issue associated with the related art, and to providing a method for controlling fail-safe of an electromechanical brake apparatus according to an embodiment of the present disclosure capable of establishing an efficient fail-safe strategy for an electromechanical brake system.

In addition, another main purpose of the present disclosure is directed to enabling a main controller, an auxiliary controller, and a plurality of wheel controllers of the electromechanical brake apparatus to independently determine their respective statuses, and activating a predesignated fail-safe mode based on the determined status information to effectively perform emergency braking of a vehicle.

The aspects of the present disclosure are not limited to those mentioned above, and other aspects not mentioned herein will be clearly understood by those skilled in the art from the following description.

According to an embodiment, the method for controlling the fail-safe of the electromechanical brake apparatus according to an embodiment of the present disclosure can establish an efficient fail-safe strategy for an electromechanical brake system.

In addition, the method for controlling the fail-safe of the electromechanical brake apparatus according to an embodiment of the present disclosure can enable a main controller, an auxiliary controller, and a plurality of wheel controllers to independently determine their respective statuses, and activate a predesignated fail-safe mode based on the determined status information to effectively perform emergency braking of a vehicle.

BRIEF DESCRIPTION OF THE DRAWINGS

FIG. 2 is a table showing fail-safe modes designated based on pre-classified status information according to an embodiment of the present disclosure.

DETAILED DESCRIPTION

Figure 1:
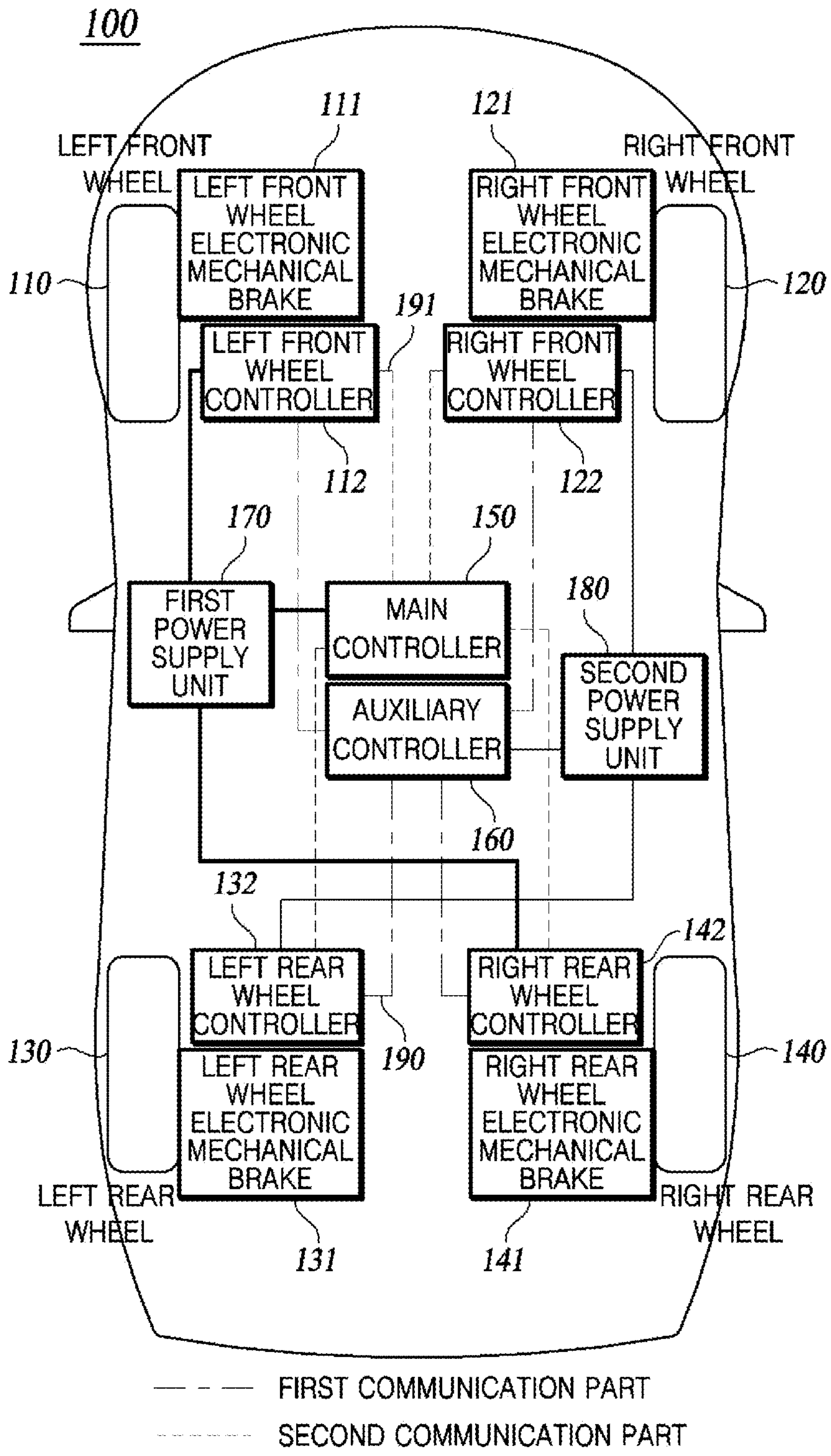
FIG. 1 is a diagram illustrating the configuration of an electromechanical brake apparatus according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a diagram illustrating the configuration of an electromechanical brake apparatus according to an embodiment of the present disclosure.

Referring to FIG. 1, the electromechanical brake apparatus according to an embodiment of the present disclosure includes all or part of a main controller 150, an auxiliary controller 160, a plurality of electromechanical brakes 111, 121, 131 and 141, a plurality of wheel controllers 112, 122, 132 and 142, a first power supply unit 170, a second power supply unit 180, a first communication part 190, and a second communication part 191.

The main controller 150, the auxiliary controller 160, and the plurality of wheel controllers 112, 122, 132, and 142 according to an embodiment of the present disclosure may be configured as an electronic control unit.

In the following description of the present disclosure, the electronic control unit described below may be described as including part or all of the main controller 150, the auxiliary controller 160, and the plurality of wheel controllers 112, 122, 132, and 142.

The main controller 150 may decide the braking force required for each wheel 110, 120, 130, and 140 of a vehicle 100 in a normal status, and may transmit a braking command to the plurality of wheel controllers 112, 122, 132, and 142 disposed in each wheel 110, 120, 130, and 140 based on the decided braking command. Herein, the normal status means a status in which the electronic control unit satisfies the control requirement performance of the vehicle 100 and is capable of implementing a function. A function degraded status and an unfunctional status, excluding the normal status, will be described later. Herein, each wheel 110, 120, 130, and 140 of the vehicle 100 includes a left front (FL) wheel 110, a right front (FR) wheel 120, a left rear (RL) wheel 130, and a right rear (RR) wheel 140.

The auxiliary controller 160 may be configured to control emergency braking of the vehicle 100 in case the function of the main controller 150 is degraded or abnormal.

The plurality of electromechanical brakes 111, 121, 131, and 141 according to an embodiment of the present disclosure may be disposed on each wheel 110, 120, 130, and 140 of the vehicle 100. For example, the plurality of electromechanical brakes 111, 121, 131, and 141 may include a left front wheel electromechanical brake 111, a right front wheel electromechanical brake 121, a left rear wheel electromechanical brake 131, and a right rear wheel electromechanical brake 141.

The plurality of wheel controllers 112, 122, 132, and 142 according to an embodiment of the present disclosure may be connected to the plurality of electromechanical brakes 111, 121, 131, and 141, respectively. For example, the plurality of wheel controllers 112, 122, 132, and 142 may include a left front wheel controller 112, a right front wheel controller 122, a left rear wheel controller 132, and a right rear wheel controller 142.

The plurality of wheel controllers 112, 122, 132 and 142 receive a braking command from the main controller 150 or the auxiliary controller 160 and generate a braking force using the respective electromechanical brakes 111, 121, 131 and 141. The plurality of wheel controllers 112, 122, 132 and 142 may perform braking by determining the braking force required for each wheel 110, 120, 130 and 140 without receiving a braking command from the main controller 150 or the auxiliary controller 160. In other words, the plurality of wheel controllers 112, 122, 132 and 142 may independently decide a braking command.

The main controller 150, the auxiliary controller 160, and the plurality of wheel controllers 112, 122, 132, and 142 according to an embodiment of the present disclosure may each determine a self-status. Specifically, based on the pre-classified status information, the main controller 150, the auxiliary controller 160, and the plurality of wheel controllers 112, 122, 132, and 142 may each decide their self-status. Herein, the pre-classified status information includes the aforementioned normal status, function degraded status, and unfunctional status.

The function degraded status of the electromechanical brake apparatus means a status in which the electronic control unit may implement the function under the condition that the control requirement performance of the vehicle 100 is reduced. In other words, the function degraded status means a status in which the performance of any one of the main controller 150, the auxiliary controller 160, and the plurality of wheel controllers 112, 122, 132, and 142 is lower than the performance of the normal status.

The unfunctional status of the electromechanical brake apparatus means a status in which the electronic control unit does not satisfy the condition that reduces the control requirement performance of the vehicle 100 or the function implementation is impossible.

The pre-classified status information of the electromechanical brake apparatus according to another embodiment of the present disclosure may also be classified by subdividing the function degraded status. For example, the subdivided function degraded status may include a first function degraded status and a second function degraded status. The subdivided function degraded status may prevent some possible functions from not being performed by simplifying and classifying the status information of the electronic control unit. In other words, the status of the electronic control unit may be subdivided and classified so that some functions of the electronic control unit are degraded and the remaining functions may be operated normally.

Each of the main controller 150, the auxiliary controller 160, and the plurality of wheel controllers 112, 122, 132, and 142 according to an embodiment of the present disclosure may share the determined self-status information with the others via the first communication part 190 or the second communication part 191. This is to check for failures between different controllers, not internal failures of each electronic control unit. Specifically, the main controller 150, the auxiliary controller 160, and the plurality of wheel controllers 112, 122, 132, and 142 may define a characteristic signal that changes periodically and continuously transmit the defined characteristic signal to other controllers. This is because the status of one or more controllers that are determined to have failed to receive the characteristic signal may be assumed as an unfunctional status. Herein, the characteristic signal may be a fault detection signal for detecting a fault status of each electronic control unit.

For example, when one of the main controller 150, the auxiliary controller 160, and the plurality of wheel controllers 112, 122, 132, and 142 is unfunctional, it may be identified when one thereof in which a fault has occurred may not transmit the characteristic signal to other controllers. Accordingly, it is desirable to process self-status information identified from the remaining normal statues with a higher priority than fault status information transmitted from one of the main controller 150, the auxiliary controller 160, and the plurality of wheel controllers 112, 122, 132, and 142 that is not functioning.

The main controller 150 and the auxiliary controller 160 illustrated in FIG. 1 are illustrated as being configured as an integral part of a single module, but are not limited thereto. The main controller 150 and the auxiliary controller 160 may be configured in different modules and may be configured to be connected to each other.

The first power supply unit 170 and the second power supply unit 180 may supply power to the main controller 150, the auxiliary controller 160, and the plurality of wheel controllers 112, 122, 132, and 142. For example, the first power supply unit 170 may configure a power line to supply power to the main controller 150, the left front wheel controller 112, and the right rear wheel controller 142. The second power supply unit 180 may configure a power line to supply power to the auxiliary controller 160, the right rear wheel controller 142, and the left rear wheel controller 132.

The first power supply unit 170 and the second power supply unit 180 according to an embodiment of the present disclosure may be connected to the plurality of wheel controllers 112, 122, 132, and 142 in an X-split structure. For example, in the event of a failure in either of the first power supply unit 170 and the second power supply unit 180, the structure is to secure an emergency braking force of the electromechanical brake for at least one of the front wheels 110 and 120 and at least one of the rear wheels 130 and 140. However, the configuration of the power lines of the first power supply unit 170 and the second power supply unit 180 is not limited thereto.

The first communication part 190 and the second communication part 191 are configured to transmit and receive information among the main controller 150, the auxiliary controller 160, and the plurality of wheel controllers 112, 122, 132, and 142. For example, in the event of an abnormality in either of the first communication part 190 and the second communication part 191, the remaining one without the abnormality may be used to transmit and receive information within the vehicle 100. Herein, the first communication part 190 and the second communication part 191 are communications designed to communicate with each other between electronic control units within the vehicle 100. The first communication part 190 and the second communication part 191 may be, for example, a controller area network (CAN) or a Local CAN.

FIG. 2 is a table showing fail-safe modes designated based on pre-classified status information according to an embodiment of the present disclosure.

Referring to FIGS. 1 and 2, the method for controlling the fail-safe of the electromechanical brake apparatus according to an embodiment of the present disclosure may maintain a drivable status or perform emergency braking based on a pre-classified fail-safe mode.

The pre-classified fail-safe mode according to an embodiment of the present disclosure may be decided based on status information of each of the main controller 150, the auxiliary controller 160, and the plurality of wheel controllers 112, 122, 132, and 142. Each of the main controller 150, the auxiliary controller 160, and the plurality of wheel controllers 112, 122, 132, and 142 may be classified into one of a normal status (Normal in FIG. 2), a function degraded status (Degraded in FIG. 2), and an unfunctional status (Abnormal in FIG. 2).

The main controller 150, the auxiliary controller 160, and the plurality of wheel controllers 112, 122, 132, and 142 may each independently determine the self-status. When the main controller 150, the auxiliary controller 160, and the plurality of wheel controllers 112, 122, 132, and 142 each determine the self-status, the self-status is determined based on a normal status, a function degraded status, and a unfunctional status without transmitting specific failure information.

Referring to the table in FIG. 2, the pre-designated fail-safe mode according to an embodiment of the present disclosure includes all or part of a first safe mode (Safe Model in FIG. 2) to a twelfth safe mode (Safe Mode12 in FIG. 2).

The first safe mode determines that the status of the main controller 150 is a function degraded status, and the auxiliary controller 160 takes over the control. When the first safe mode is activated, the auxiliary controller 160 may activate a limp-home mode to control the vehicle 100 to continue driving.

The second safe mode determines that the status of the main controller 150 is a unfunctional status, and the auxiliary controller 160 takes over the control. The auxiliary controller 160 may activate the limp-home mode to control the vehicle 100 to maintain a continuously drivable status.

The third safe mode determines that the status of the auxiliary controller 160 is a function degraded status, and the main controller 150 controls the driving of the vehicle 100. When the third safe mode is activated, the main controller 150 may activate the limp-home mode to control the vehicle 100 to continue driving.

The fourth safe mode determines that the auxiliary controller 160 is in an unfunctional status, and the main controller (150) controls the driving of the vehicle 100. The main controller 150 may activate the limp-home mode to control the vehicle 100 to maintain a continuously drivable status.

The first to fourth safe modes according to an embodiment initiate a fail-safe strategy of the vehicle 100 when either the main controller 150 or the auxiliary controller 160 is in a function degraded status or an unfunctional status. The first safe mode to the fourth safe mode may control the driving of the vehicle 100 by one of the main controller 150 or the auxiliary controller 160 in a normal status, which is in charge of control, determining a braking command and transmitting the determined braking command to the plurality of wheel controllers 112, 122, 132, and 142. Accordingly, the first safe mode to the fourth safe mode may continuously control the driving of the vehicle 100 by activating the limp-home mode.

For example, assuming a situation where the fourth safe mode is additionally activated in the vehicle 100 that is driving based on the second safe mode, a situation occurs in which the plurality of wheel controllers 112, 122, 132, and 142 may not receive braking commands from both the main controller 150 and the auxiliary controller 160. In this connection, even when both the second safe mode and the fourth safe mode are activated, the vehicle 100 may perform emergency braking of the vehicle 100 using the plurality of wheel controllers 112, 122, 132, and 142. This is because each of the plurality of wheel controllers 112, 122, 132, and 142 may generate an emergency braking force based on a preset braking force. Accordingly, since the second safe mode may generate an emergency braking force even when the fourth safe mode in which the auxiliary controller 160 is in an unfunctional status is activated, the limp-home mode may be activated to continue driving the vehicle 100.

This is not limited to the second safe mode, and may be equally applied when the fourth safe mode is activated. For example, assuming a situation in which the second safe mode is additionally activated in the vehicle 100 driving based on the fourth safe mode, in this connection, a preset braking force may also be generated from the plurality of wheel controllers 112, 122, 132, and 142. Since the fourth safe mode may generate an emergency braking force even when the second safe mode in which the main controller 150 is in an unfunctional status is activated, the limp-home mode may be activated to continue driving the vehicle 100.

In explaining an embodiment of the present disclosure, activating the limp-home mode to control the driving of the vehicle 100 means controlling the driving of the vehicle 100 with a lower control requirement performance than the control requirement performance in a normal status. Herein, the lower control requirement performance means limiting the speed of the vehicle 100 in a normal status or limiting the drivable operating time of the vehicle 100. However, the control requirement performance is not limited thereto, and may include various driving variables related to the driving of the vehicle 100.

The fifth to twelfth safe modes according to an embodiment disclose a fail-safe method based on a function degraded status or an unfunctional status of each of the plurality of wheel controllers 112, 122, 132, and 142.

The fifth, seventh, ninth, and eleventh safe modes according to an embodiment disclose a fail-safe method of the vehicle 100 when the left front wheel controller 112, the right front wheel controller 122, the left rear wheel controller 132, and the right rear wheel controller 142 are each in a function degraded status.

The fifth safe mode determines that the left front wheel controller 112 among the plurality of wheel controllers 112, 122, 132, and 142 is in a function degraded status, and activates the limp-home mode to continuously control the driving of the vehicle 100.

For example, when the left front wheel controller 112 is in a function degraded status, the left front wheel electromechanical brake 111 may not satisfy the braking force required from the main controller 150 or the auxiliary controller 160. Accordingly, the main controller 150 or the auxiliary controller 160 recalculates the braking force required for the vehicle 100 and transmits a braking command to the right front wheel controller 122, the left rear wheel controller 132, and the right rear wheel controller 142 that are determined to be in a normal status. Simultaneously, the main controller 150 or the auxiliary controller 160 may transmit a braking command to the left front wheel controller 112 whose function is degraded, and the left front wheel controller 1120 may generate a braking force lower than the previously required braking force. Accordingly, the fifth safe mode may continuously control the driving of the vehicle 100 by activating the limp-home mode.

The seventh safe mode, the ninth safe mode, and the eleventh safe mode according to an embodiment may be implemented in the same manner as the fifth safe mode described above. For example, the seventh safe mode, the nineth safe mode, and the eleventh safe mode may continuously control the driving of the vehicle 100 by activating the limp-home mode based on a lower requirement performance than a braking force in a normal status by using one of the functionally degraded wheel controllers and the remaining ones in a normal status among the plurality of wheel controllers 112, 122, 132, and 142, even when the right front wheel controller 122, the left rear wheel controller 132, and the right rear wheel controller 142 are determined to be in a function degraded status.

The sixth safe mode, the eighth safe mode, the tenth safe mode and the twelfth safe mode according to an embodiment disclose a fail-safe method of the vehicle 100 when each of the left front wheel controller 112, the right front wheel controller 122, the left rear wheel controller 132 and the right rear wheel controller 142 is in an unfunctional status.

The sixth safe mode determines that the left front wheel controller 112 among the plurality of wheel controllers 112, 122, 132 and 142 is in an unfunctional status, and only emergency braking of the vehicle 100 is possible using the right front wheel controller 122, the left rear wheel controller 132 and the right rear wheel controller 142.

For example, when the sixth safe mode is activated and the tenth safe mode is additionally activated, the left front wheel electromechanical brake 111 and the left rear wheel electromechanical brake 131 may not generate a braking force, and only the right front wheel electromechanical brake 121 and the right rear wheel electromechanical brake 141 may generate a braking force. In this connection, since the vehicle 100 may generate only a one-sided (right-side) braking force, a dangerous situation may occur in which the vehicle 100 deviates from the lane differently from the steering of a driver during emergency braking. Accordingly, it is preferable that the sixth safe mode or the tenth safe mode perform emergency braking of the vehicle 100 without activating the limp-home mode.

However, even when both the sixth safe mode and the tenth safe mode are activated and only one-sided braking of the vehicle 100 is possible, the limp-home mode may be activated to continuously control the driving of the vehicle 100 when cooperative control of the braking system and the steering system according to an embodiment is possible.

This is not limited to the sixth safe mode and the tenth safe mode, and may be equally applied even when the eighth safe mode and the twelfth safe mode are each activated.

For example, assuming a situation in which the twelfth safe mode is additionally activated in the vehicle 100 driving based on the eighth safe mode, in this connection, the vehicle 100 may generate only an one-sided (left-sided) braking force using the left front wheel electromechanical brake 111 and the left rear wheel electromechanical brake 131, which may result in a dangerous situation in which the vehicle 100 deviates from the lane in emergency braking, unlike the steering of a driver. Accordingly, it is preferable that the eighth safe mode or the twelfth safe mode perform emergency braking of the vehicle 100 without activating the limp-home mode. However, even in a situation in which only one-sided braking of the vehicle 100 is possible due to the eighth safe mode and the twelfth safe mode being activated, when cooperative control of the braking system and the steering system according to an embodiment is possible, the driving of the vehicle 100 may be continuously controlled by activating the limp-home mode.

Figure 3:
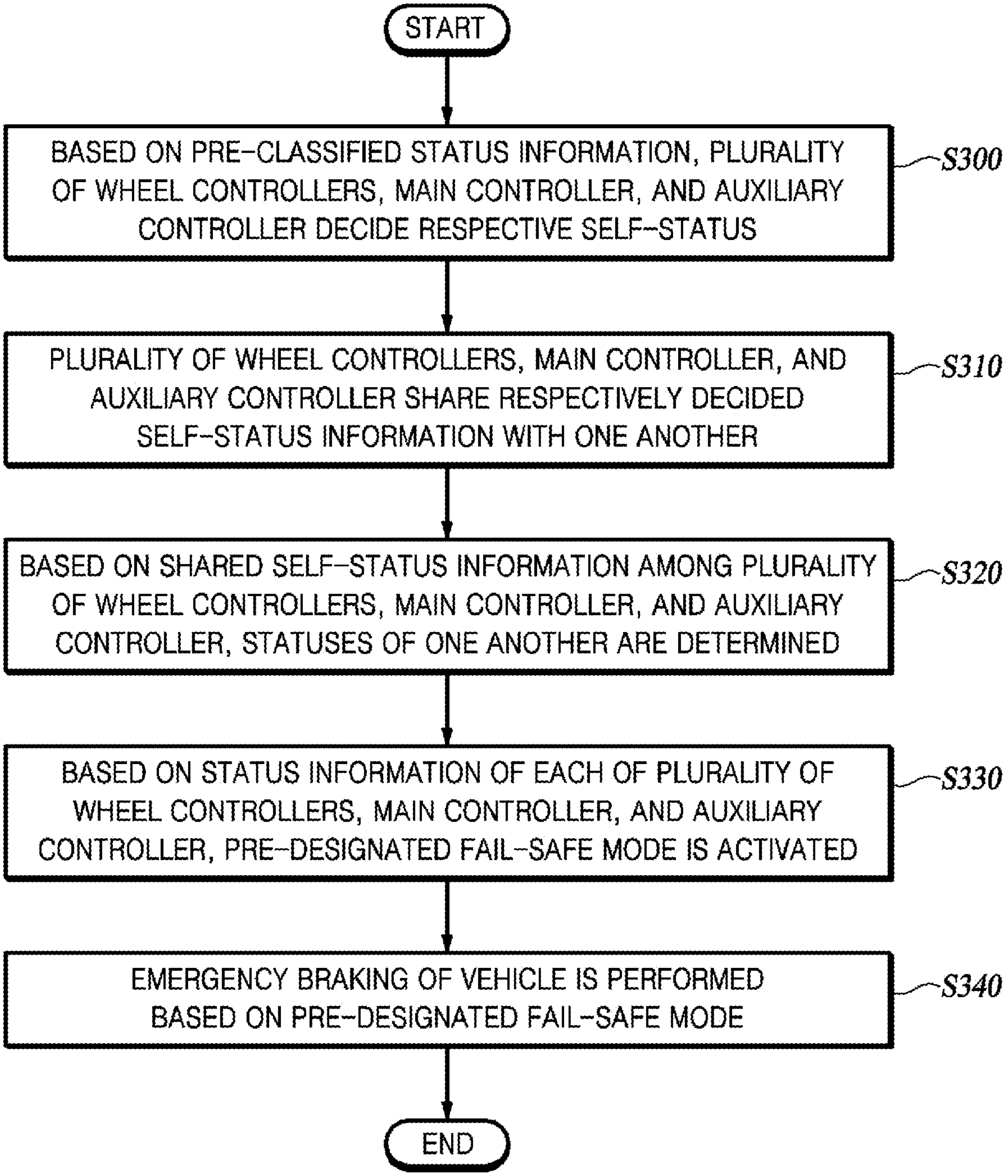
FIG. 3 is a flowchart showing a method for controlling fail-safe of an electromechanical brake apparatus according to an embodiment of the present disclosure.

FIG. 3 is a flowchart showing a method for controlling fail-safe of an electromechanical brake apparatus according to an embodiment of the present disclosure.

Referring to FIGS. 1 to 3, based on the pre-classified status information, the plurality of wheel controllers 112, 122, 132, and 142, the main controller 150, and the auxiliary controller 160 decide the respective self-status (S300).

Each of the plurality of wheel controllers 112, 122, 132, and 142, the main controller 150, and the auxiliary controller 160 share the respectively decided self-status information with the others (S310). Part or all of the first communication part 190 connected to the plurality of wheel controllers 112, 122, 132 and 142 from the main controller 150 and the second communication part 191 connected to the plurality of wheel controllers 112, 122, 132 and 142 from the auxiliary controller 160 may be used to share the self-status information with each other.

Based on the shared self-status information among the plurality of wheel controllers 112, 122, 132 and 142, the main controller 150, and the auxiliary controller 160, each of the plurality of wheel controllers 112, 122, 132 and 142, the main controller 150, and the auxiliary controller 160 may determine the statuses of the others (S320). The plurality of wheel controllers 112, 122, 132 and 142, the main controller 150 and the auxiliary controller 160 may each define a characteristic signal that changes periodically and continuously transmit the defined characteristic signal with each other. The status of one or more controllers that are determined to have failed to receive the characteristic signal may be assumed as an unfunctional status.

Based on the status information of each of the plurality of wheel controllers 112, 122, 132, and 142, the main controller 150, and the auxiliary controller 160, a pre-designated fail-safe mode is activated (S330). When either the main controller 150 or the auxiliary controller 160 is determined to be in a function degraded status or an unfunctional status, the remaining one of the main controller 150 or the auxiliary controller 160 in a normal status may continue driving based on the emergency braking or limp-home mode of the vehicle 100. For example, when the main controller 150 is in an unfunctional status, the auxiliary controller 160 may control the driving of the vehicle 100 based on the low control requirement performance of the main controller 150.

When any one of the plurality of wheel controllers 112, 122, 132 and 142 is determined to be in a function degraded status or an unfunctional status, the remaining ones in a normal status among the plurality of wheel controllers 112, 122, 132 and 142 may receive an emergency braking command and control the driving of the vehicle 100.

The emergency braking or driving of the vehicle 100 is performed based on a pre-designated fail-safe mode (S340).

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method of operating an electromechanical brake apparatus for fail-safe control, the electromechanical brake apparatus comprising a plurality of wheel controllers, a main controller and an auxiliary controller which are configured to control a plurality of electromechanical brakes respectively disposed on a plurality of wheels of a vehicle, the method comprising:

causing each of the plurality of wheel controllers, the main controller, and the auxiliary controller to decide, based on pre-classified status information, a self-status of each of the plurality of wheel controllers, the main controller and the auxiliary controller;

causing each of the plurality of wheel controllers, the main controller and the auxiliary controller to share the self-status with the others;

causing each of the plurality of wheel controllers, the main controller and the auxiliary controller to determine, based on the self-status shared by the others, a status of each of the others;

activating a pre-designated fail-safe mode based on the shared status of each of the plurality of wheel controllers, the main controller and the auxiliary controller; and performing (1) emergency braking of the vehicle based on the pre-designated fail-safe mode or (2) maintaining the vehicle in a drivable status.

2. The method of claim 1, wherein the self-status of each of the plurality of wheel controllers, the main controller and the auxiliary controller is decided based on one of:

a normal status in which control requirement performance of the vehicle is satisfied and function implementation is possible;

a function degraded status in which the function implementation is possible under a condition in which the control requirement performance of the vehicle is reduced; and an unfunctional status in which the condition in which the control requirement performance of the vehicle is reduced is not satisfied or the function implementation is impossible.

3. The method of claim 1, wherein the self-status of each of the plurality of wheel controllers, the main controller and the auxiliary controller is shared with the others by using at least one of a first communication part connected between the plurality of wheel controllers and the main controller and a second communication part connected between the plurality of wheel controllers and the auxiliary controller.

4. The method of claim 1, wherein causing each of the plurality of wheel controllers, the main controller and the auxiliary controller to determine the status of each of the others comprises:

causing each of the plurality of wheel controllers, the main controller and the auxiliary controller to define a characteristic signal that changes periodically for each of the plurality of wheel controllers, the main controller and the auxiliary controller; and causing each of the plurality of wheel controllers, the main controller and the auxiliary controller to continuously transmit the defined characteristic signal to the others while assuming that the status of at least one of the plurality of wheel controllers, the main controller and the auxiliary controller that is determined to have failed to receive the characteristic signal as an unfunctional status.

5. The method of claim 1, wherein:

activating the pre-designated fail-safe mode based on the shared status of each of the plurality of wheel controllers, the main controller and the auxiliary controller comprises performing emergency driving or the emergency braking of the vehicle by a remaining one of the main controller and the auxiliary controller in a normal status in response to determining that the main controller or the auxiliary controller is in a function degraded status or an unfunctional status, and when the main controller is in the unfunctional status, the auxiliary controller controls the vehicle to perform the emergency braking based on control requirement performance lower than the emergency braking when the main controller is in the function degraded status.

6. The method of claim 1, wherein activating the pre-designated fail-safe mode based on the shared status of each of the plurality of wheel controllers, the main controller and the auxiliary controller includes performing emergency driving or the emergency braking of the vehicle using one of the plurality of wheel controllers that is in a normal status when one of the plurality of wheel controllers is determined to be in a function degraded status or an unfunctional status.

7. An electromechanical brake apparatus, comprising:

a main controller configured to control driving and braking of a vehicle;

an auxiliary controller configured to control the driving and braking of the vehicle when the main controller is in a function degraded status or an unfunctional status;

a plurality of wheel controllers respectively connected to a plurality of electromechanical brakes respectively coupled to a plurality of wheels of the vehicle, the plurality of wheel controllers configured to generate a braking force for the vehicle using the plurality of electromechanical brakes;

a first power supply unit and a second power supply unit configured to supply power to the main controller, the auxiliary controller and the plurality of wheel controllers; and a first communication part and a second communication part configured to transmit information among the main controller, the auxiliary controller and the plurality of wheel controllers, wherein each of the main controller, the auxiliary controller and the plurality of wheel controllers is configured to (1) decide, based on pre-classified status information, a self-status of each of the main controller, the auxiliary controller and the plurality of wheel controllers, and (2) share the decided self-status with the others to perform emergency braking of the vehicle or maintain the vehicle in a drivable status.

8. The apparatus of claim 7, wherein each of the main controller, the auxiliary controller and the plurality of wheel controllers is configured to (1) define a characteristic signal that changes periodically and (2) continuously transmit the defined characteristic signal to the others while a status of one of the main controller, the auxiliary controller and the plurality of wheel controllers that has failed to receive the characteristic signal is assumed as an unfunctional status.

9. The apparatus of claim 7, wherein the auxiliary controller is configured, in response to the main controller being in the unfunctional status, to control the vehicle to perform the emergency braking based on control requirement performance lower than the emergency braking when the main controller is in the function degraded status or the unfunctional status.

10. The apparatus of claim 7, wherein the plurality of wheel controllers is configured to perform emergency driving or the emergency braking of the vehicle using a remaining one of the plurality of wheel controllers in a normal status when one of the plurality of wheel controllers is determined to be in the function degraded status or the unfunctional status.

* * * * *